(12) United States Patent
Chang et al.

(10) Patent No.: US 10,023,432 B2
(45) Date of Patent: Jul. 17, 2018

(54) GUIDE RAIL FOR ELEVATOR

(71) Applicant: Otis Elevator Company, Farmington, CT (US)

(72) Inventors: Xiaoyuan Chang, Ellington, CT (US); David R. Torlai, Torrington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 15/035,043

(22) PCT Filed: Nov. 8, 2013

(86) PCT No.: PCT/US2013/069068
§ 371 (c)(1),
(2) Date: May 6, 2016

(87) PCT Pub. No.: WO2015/069268
PCT Pub. Date: May 14, 2015

(65) Prior Publication Data
US 2016/0280512 A1  Sep. 29, 2016

(51) Int. Cl.
*B66B 7/02* (2006.01)
*B32B 37/12* (2006.01)
*B32B 38/10* (2006.01)

(52) U.S. Cl.
CPC .............. *B66B 7/022* (2013.01); *B32B 37/12* (2013.01); *B32B 38/10* (2013.01); *B32B 2307/752* (2013.01)

(58) Field of Classification Search
CPC .......... B66B 7/022; B32B 37/12; B32B 38/10
See application file for complete search history.

(56) References Cited

U.S. PATENT DOCUMENTS 5,294,278 A * 3/1994 Matsui ............... B05D 5/00
150/166
6,080,254 A * 6/2000 Draper ............... B32B 7/06
138/DIG. 6

(Continued)

FOREIGN PATENT DOCUMENTS

CN     1824836 A   8/2006
CN     201183699 Y  1/2009
(Continued)

OTHER PUBLICATIONS

Notification of Transmittal of thr International Search Report and the Written Opinion of the International Searching Authority, or the Declaration; dated Aug. 13, 2014; 12 pages.

(Continued)

*Primary Examiner* — Michael A Riegelman
(74) *Attorney, Agent, or Firm* — Cantor Colburn LLP

(57) ABSTRACT

A method of making a guide rail for an elevator system includes providing a metallic guide rail having a base portion and a blade portion extending from the base portion. The blade portion includes one or more guide surfaces interactive with a safety brake of the elevator system. A protective layer is applied to the guide rail for corrosion protection and a perimeter of the protective layer is adhered to the guide rail to seal the guide surfaces from corrosive elements, while not adhering the protective layer to the guide surfaces.

16 Claims, 2 Drawing Sheets

(56) References Cited

U.S. PATENT DOCUMENTS

| | | | | |
|---|---|---|---|---|
| 6,124,044 A * | 9/2000 | Swidler | ............... | B05D 5/00 |
| | | | | 427/154 |
| 6,464,821 B1 * | 10/2002 | Phillips | ............... | E04D 5/12 |
| | | | | 156/247 |
| 7,892,384 B2 * | 2/2011 | Bartusiak | ............... | C09J 7/02 |
| | | | | 156/196 |
| 2006/0199017 A1 | 9/2006 | Resch et al. | | |
| 2008/0210495 A1 | 9/2008 | Fargo | | |
| 2009/0202773 A1 * | 8/2009 | Burgoon | ............... | C09J 7/0207 |
| | | | | 428/42.2 |

FOREIGN PATENT DOCUMENTS

| | | | |
|---|---|---|---|
| CN | 101688091 A | | 3/2010 |
| CN | 202964266 U | | 6/2013 |
| JP | 54047740 A | * | 4/1979 |
| JP | 363200575 U | | 12/1988 |
| JP | 2006095413 | | 8/2008 |
| JP | 2006095413 A1 | | 8/2008 |
| JP | 2013218991 A | | 5/2016 |
| JP | 6003170 B2 | | 10/2016 |
| WO | 2011116523 A1 | | 9/2011 |
| WO | 2013055339 A1 | | 4/2013 |

OTHER PUBLICATIONS

European Search Report and Written Opinion; European Application No. 13896989.4; International Filing Date: Nov. 8, 2013; dated Jun. 7, 2017; 11 pages.

Chinese Office Action Issued in CN Application No. 201380080796.X, dated Mar. 20, 2018, 9 Pages.

* cited by examiner

GUIDE RAIL FOR ELEVATOR

BACKGROUND OF THE INVENTION

This invention generally relates to guide rails. More specifically, this invention relates to guide rails for an elevator system.

Elevator systems typically include a set of guide rails for guiding an elevator car as it moves vertically within a hoistway. Typical guide rails have a generally T-shaped cross-section with a base portion that is secured to a hoistway wall using conventional brackets. A blade portion extending away from the base portion provides guiding surfaces along which guide rollers or slides travel during movement of the elevator car. The blade portion of the guide rail additionally provides a surface that the elevator safeties engage during an overspeed condition. Because of these functions, the blade portion of a guide rail must have suitable surface characteristics. Conventional guide rails are made from steel, and the surfaces must be protected from corrosion during storage and shipment as well as during use in the hoistway. The base portion of a guide rail is typically painted to prevent corrosion. The blade portion, however, is not painted in order to prevent the paint from affecting the operation of the elevator safeties that must act on the blade portion.

Nevertheless, the blade portion of the guide rails should be protected from corrosion during shipment and storage before the time of installation. One conventional method includes applying an anti-corrosion coating, such as wax, grease or oil, to the blade portion. No consistent and/or efficient cleaning process exists to remove the coating and to ensure a suitable surface for the safety to engage. The labor and expense involved with removing the coating introduces additional cost and time required for installation of an elevator system. In addition, the coating must unfortunately be removed at the installation site using a chemical solvent. This technique generates waste, such as rags soaked with solvent that requires disposal.

SUMMARY OF THE INVENTION

In one embodiment, a method of making a guide rail for an elevator system includes providing a metallic guide rail having a base portion and a blade portion extending from the base portion. The blade portion includes one or more guide surfaces interactive with a safety brake of the elevator system. A protective layer is applied to the guide rail for corrosion protection and a perimeter of the protective layer is adhered to the guide rail to seal the guide surfaces from corrosive elements, while not adhering the protective layer to the guide surfaces.

Alternatively or additionally, in this or other embodiments opposing sides of the protective layer are adhered to one another at longitudinal ends of the guide rail.

Alternatively or additionally, in this or other embodiments, the perimeter of the protective layer is adhered to the guide rail by applying an adhesive backing to the perimeter of the protective layer and securing the adhesive backing at the guide rail.

Alternatively or additionally, in this or other embodiments, the protective layer adheres to a root portion of the blade portion.

Alternatively or additionally, in this or other embodiments, at least a portion of the protective layer is removed from the guide rail.

Alternatively or additionally, in this or other embodiments, the removing step comprises peeling at least a portion of the protective layer from the guide rail.

Alternatively or additionally, in this or other embodiments, the removing step does not use a solvent.

Alternatively or additionally, in this or other embodiments, the protective layer is formed from one of a plastic material, paper or cardboard.

Alternatively or additionally, in this or other embodiments, the protective layer is longer than the guide rail.

In another embodiment, a metal guide rail for an elevator system includes a base portion and a blade portion extending from the base portion. The blade portion includes one or more guide surfaces for engaging a guiding device and/or a safety of the elevator system. A protective layer is applied to the guide rail for corrosion protection. The protective layer is adhered to the guide rail thus sealing the guide surfaces from exposure to corrosive elements, while not adhering the protective layer to the guide surfaces.

Alternatively or additionally, in this or other embodiments opposing sides of the protective layer are adhered to one another at longitudinal ends of the guide rail.

Alternatively or additionally, in this or other embodiments, the perimeter of the protective layer is adhered to the guide rail by applying an adhesive backing to the perimeter of the protective layer and securing the adhesive backing at the guide rail.

Alternatively or additionally, in this or other embodiments, the protective layer adheres to a root portion of the blade portion.

Alternatively or additionally, in this or other embodiments, at least a portion of the protective layer is removed from the guide rail.

Alternatively or additionally, in this or other embodiments, the removing step comprises peeling at least a portion of the protective layer from the guide rail.

Alternatively or additionally, in this or other embodiments, the removing step does not use a solvent.

Alternatively or additionally, in this or other embodiments, the protective layer is formed from one of a plastic material, paper or cardboard.

Alternatively or additionally, in this or other embodiments, the protective layer is longer than the guide rail.

DETAILED DESCRIPTION OF THE INVENTION

Figure 1:
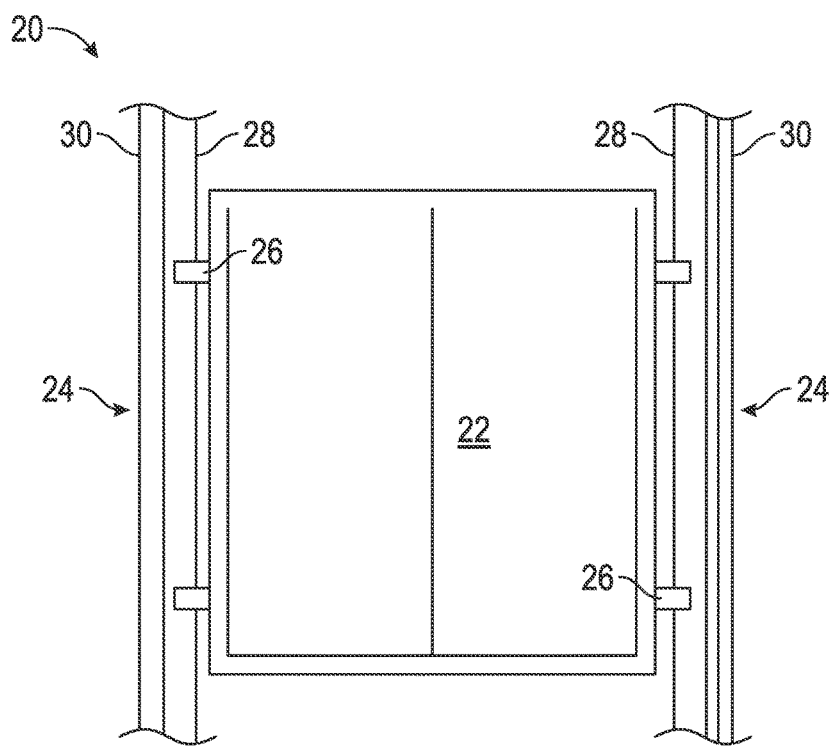
FIG. 1 schematically illustrates selected portions of an elevator system.

FIG. 1 schematically shows selected portions of an elevator system 20. Components of the elevator system that are not relevant to the present invention (e.g. ropes/belts, governor assembly, etc.) are not discussed. An elevator car 22 can travel along one or more guide rails 24 through the operation of one or more guiding devices 26 mounted to the car 22. Examples of said guiding devices 26 include roller guides or sliding guide shoes that engage the guide rails 24 in a known manner.

In some arrangements, although not shown in the figures, the elevator system could include a counterweight that can also travel along one or more guide rails through the operation of one or more guiding devices. The counterweight guide rails could also benefit from the present invention.

Figure 2:
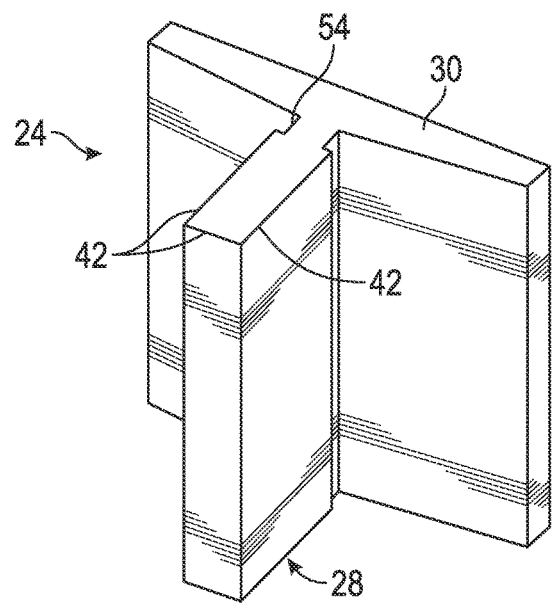
FIG. 2 is a perspective view of a T-shaped guide rail.

FIG. 2 illustrates a conventional guide rail. The guide rail 24 includes a blade portion 28 and a base portion 30. The base portion 30 facilitates mounting the guide rail 24 within a hoistway, for example using known brackets. The blade portion 28 extends from the base portion 30 and engages the guiding devices 26 during movement of the elevator car 22. In this illustrated example, the blade portion 28 has multiple guiding surfaces 42 along which the guiding devices 26 travel. At least one of the guiding surfaces 42 also serves as a braking surface for elevator safeties (not shown) to engage. As is known, elevator safeties engage the guide rail 24 during certain events, such as an over speed condition. The engagement of a safety on the guide rail 24 creates a significant bending moment on the guide rail 24. Guide rails 24 are conventionally made from cold-rolled steel to achieve the stiffness necessary to withstand such bending moment. The present invention could be used on conventional guide rails 24 or guide rails 24 formed from sheet metal.

Figure 3:
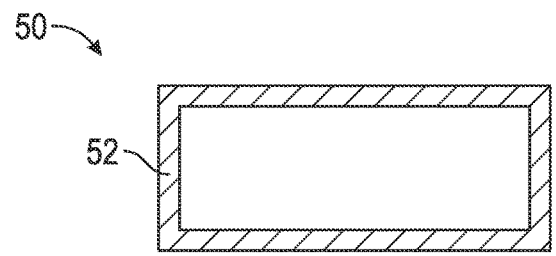
FIG. 3 is a plan view of an embodiment of a protective layer for a guide rail.
Figure 4:
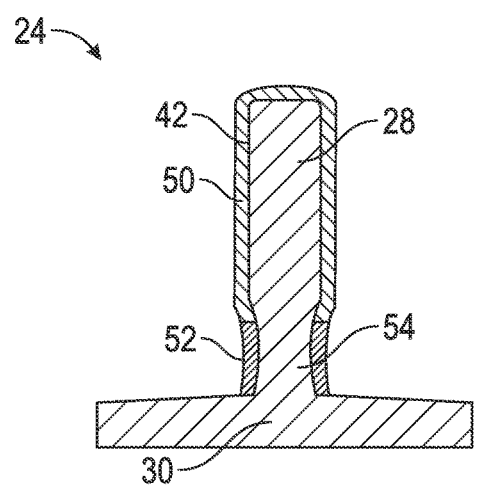
FIG. 4, is a cross-sectional view of an embodiment of a guide rail with a protective layer installed thereto.
Figure 5:
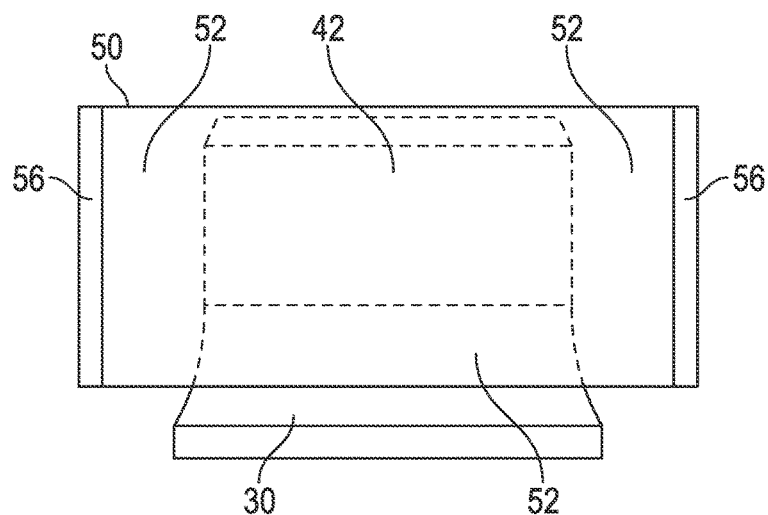
FIG. 5 is a plan view of an embodiment of a guide rail with a protective layer installed thereto.

Referring now to FIGS. 3-5, to protect surfaces of the guide rail 24, such as blade portion 28, to prevent corrosive oxidation or other damage to the guide rail 24 during storage and/or transportation prior to installation of the guide rail 24, a protective layer 50 is applied to the desired surface(s) of the guide rail 24. As an example, the protective layer 50 could be made of one or more plastic materials (in one or more layers), such as polyethylene, formed into a sheet. The protective layer may also be formed from other film materials, or materials such as paper or cardboard. As shown in FIG. 3, the protective layer 50 is formed as a sheet, and has an adhesive backing 52 located at a perimeter of the protective layer 50, for example, at an outer ½ inch of the protective layer 50 around an entire perimeter of the protective layer 50, with no adhesive backing in the remaining portions of the protective layer 50.

Referring now to FIGS. 4 and 5, the protective layer 50 is applied to the guide rail 24 to protect the blade portion 28 from corrosion, thus maintaining thickness and other surface properties of the blade portion 28 for proper engagement of the elevator safeties to the guide surfaces 42. The protective layer 50 is laid over the guide rail 24 and the adhesive backing 52 is applied to a root portion 54 of blade portion 28, located between the guide surfaces 42 and the base portion 30 and/or other portions of the guide rail 24, such that the adhesive backing 52 does not contact the guide surfaces 42. Alternatively, the protective layer 50 may be applied to the guide rail 24 such that the adhesive backing 52 is adhered to the base portion 30. As shown in FIG. 5, the protective layer 50 is longer than the guide rail 24 and is folded over the blade portion 28 so that at each longitudinal end 56 of the guide rail 24 the adhesive backing 52 at one side of the guide rail 24 is adhered to the adhesive backing 52 at the other side of the guide rail 24. In some embodiments, the ends of the protective layer 50 are cut on a diagonal, for easier wrapping over the guide rail ends 56. Thus, the guide surfaces 42 are effectively sealed beneath the protective layer 50 by the adhesive backing 52, without adhesive being present on the guide surfaces 42 themselves.

To assure good sealing, the adhesive backing 52 must have adequate bond strength to strongly and tightly seal the guide surfaces 42 from moisture and/or aggressive chemical attack. Since the adhesive backing 52 is applied only at the edges of the protective layer 50, the guide surfaces are not contaminated by adhesive, so there is no need to clean the guide surfaces 42 after removal of the protective layer 50 when the guide rail 24 is installed. Further, because the adhesive backing 52 is only present at the edges, the protective layer 50 is relatively easy to remove from the guide rail 24 as compared to other protective layers having an adhesive backing over a greater portion of the surface.

It is to be appreciated that while embodiments are described herein where the protective layer 50 is secured to the guide rail 24 by adhesive backing 52, one skilled in the art will appreciate that other devices such as hooks, snaps, clamps, magnets, hook and loop systems, form fit or other devices or methods may be used to secure the protective layer to the guide rail.

The protective layer 50 disclosed herein significantly reduces cost compared to the prior oil/grease protective applied to the guide rails. Further, the protective layer eliminates use of the oil and grease, and also eliminated the solvents used for oil and grease removal, thus improving environmental health and safety conditions at guide rail installation.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of applying a corrosion protection system to a guide rail for an elevator system, comprising:
   providing a metallic guide rail having:
      a base portion; and
      a blade portion extending from the base portion, the blade portion including two opposing guide surfaces;
   applying a protective layer to the guide rail for corrosion protection; and
   securing the protective layer to the guide rail to seal the guide surfaces from corrosive elements, while not securing the protective layer to the guide surfaces;
   wherein a first portion of the protective layer having a first end is applied to a first guide surface of the two opposing guide surfaces; and
   wherein a second portion of the protective layer having a second end is applied to a second guide surface of the two opposing guide surfaces; and
   wherein the first end is adhered to the second end at a longitudinal end of the guide rail.

2. The method of claim 1, wherein securing the protective layer to the guide rail includes:
   applying an adhesive backing to a perimeter of the protective layer;
   and securing the adhesive backing at the guide rail.

3. The method of claim 2, wherein the protective layer adheres to a root portion of the blade portion.

4. The method of claim 1, further comprising removing at least a portion of the protective layer from the guide rail.

5. The method of claim 4, wherein the removing step comprises peeling at least a portion of the protective layer from the guide rail.

6. The method of claim 4, wherein the removing step does not use a solvent.

7. The method of claim 1, wherein the protective layer is formed from one of a plastic material, paper or cardboard.

8. The method of claim 1, wherein the protective layer is longer than the guide rail.

9. A metal guide rail for an elevator system, comprising:
 a base portion;
 a blade portion extending from the base portion, the blade portion including two opposing guide surfaces; and
 a protective layer applied to the guide rail for corrosion protection, the protective layer secured to the guide rail thus sealing the guide surfaces from exposure to corrosive elements, while not securing the protective layer to the guide surfaces;
 wherein a first portion of the protective layer having a first end is applied to a first guide surface of the two opposing guide surfaces; and
 wherein a second portion of the protective layer having a second end is applied to a second guide surface of the two opposing guide surfaces; and
 wherein the first end is adhered to the second end at a longitudinal end of the guide rail.

10. The guide rail of claim 9, wherein the protective layer includes an adhesive backing applied to the perimeter of the protective layer, the adhesive backing adhered to the guide rail.

11. The guide rail of claim 10, wherein the protective layer adheres to a root portion of the blade portion.

12. The guide rail of and of claim 9, wherein at least a portion of the protective layer is removed from the guide rail.

13. The guide rail of claim 12, wherein the portion of the protective layer is removed by peeling at least a portion of the protective layer from the guide rail.

14. The guide rail of claim 12, wherein the removal does not use a solvent.

15. The guide rail of claim 9, wherein the protective layer is formed from one of a plastic material, paper or cardboard.

16. The guide rail of claim 9, wherein the protective layer is longer than the guide rail.

* * * * *